United States Patent [19]

Landais et al.

[11] Patent Number: 5,228,383
[45] Date of Patent: Jul. 20, 1993

[54] AUTOMATIC COFFEEMAKER

[75] Inventors: Francis P. J. Landais, Mamers; Gilles G. A. V. Morin, Alencon, both of France

[73] Assignee: Moulinex (Societe Anonyme), Bagnolet, France

[21] Appl. No.: 819,797

[22] Filed: Jan. 13, 1992

[30] Foreign Application Priority Data

Jan. 25, 1991 [FR] France ................... 91 00845

[51] Int. Cl.$^5$ ............................................ A47J 31/00
[52] U.S. Cl. .................................. 99/289 R; 99/297; 99/302 P
[58] Field of Search .............. 99/289 R, 297, 302 R, 99/302 P, 305, 318; 100/215, 218, 125, 126, 127

[56] References Cited

U.S. PATENT DOCUMENTS

| | | | |
|---|---|---|---|
| 4,111,108 | 9/1978 | Moser | 99/302 P |
| 4,230,033 | 10/1980 | Cuccia | 99/289 R |
| 4,467,715 | 8/1984 | Bunger | 100/116 |
| 4,797,296 | 1/1989 | Meier et al. | 99/302 P |
| 4,848,222 | 7/1989 | Fleissner | 100/246 |

FOREIGN PATENT DOCUMENTS

| | | |
|---|---|---|
| 0237399 | 9/1987 | European Pat. Off. |
| 2006930 | 10/1970 | Fed. Rep. of Germany |
| 1293783 | 4/1962 | France |
| 0524105 | 4/1955 | Italy |
| 511009 | 9/1971 | Switzerland |
| 635740 | 4/1983 | Switzerland |
| 761523 | 11/1956 | United Kingdom |

Primary Examiner—Harvey C. Hornsby
Assistant Examiner—Reginald L. Alexander
Attorney, Agent, or Firm—Young & Thompson

[57] ABSTRACT

A cylinder (3) is closed, on the one hand, by a cover (4) and, on the other hand, by a ferrule (5) traversed by a rotatable shaft (6). The cylinder (3) is so disposed as to close an infusion chamber (15) delimited by the cover and by a sliding piston (17) driven by a translatory drive (18) integral with the shaft. A jacket (19) is slidably mounted by an actuating device (20) connected to the shaft (6), the piston (17) is itself slidably mounted in the jacket (19), the different positions of the jacket and of the piston being defined relative to each other by a selector (35) of the number of rotations of the shaft. Application particularly for household coffeemaking machines.

8 Claims, 4 Drawing Sheets

AUTOMATIC COFFEEMAKER

BACKGROUND OF THE INVENTION

The invention relates to an automatic coffeemaker comprising, in a housing, a fixed body which comprises a cylinder closed, on the one hand, by a cover and, on the other hand, by a ferrule traversed by a rotating shaft connected to motor means, and in which are provided openings, an opening for passage of the grind adapted for the introduction of a quantity of ground coffee, a feed opening for liquid adapted to introduce a quantity of hot water from a water heater, an outlet passage for the infusion, and an opening for ejection of the grounds.

The invention concerns more particularly a coffeemaker of this type in which said cylinder is so arranged as to enclose a cylindrical infusion chamber delimited at its ends, on the one hand, by a cover and, on the other hand, by the front surface of a piston which is slidably mounted in the cylinder thanks to translatory drive means fixed for rotation with said shaft, and which can occupy at least two positions, either a rest position in which the piston is retracted from the opening of the passage for the grind, permitting the flow of said grind into the chamber, or a packing position in which the opening of the passage for the grind being closed, the piston packs the grind below the ejection opening against the cover.

In known machines of this type, the ground coffee is introduced into the infusion chamber which is then sealed. The piston packs the grind. Hot water is then passed through the grind, then when the infusion is produced, it is removed by the infusion outlet opening, while the grounds are ejected. To perform this cycle, recourse is had to complicated and costly mechanisms of little reliability at this time.

Moreover, these machines permit producing only an infusion of the "espresso" type, the volume of the infusion chamber being constant at the time of infusion, and the pressure exerted by the piston being also continuously constant.

SUMMARY

The invention has for its object to simplify the existing mechanisms, and to provide an apparatus which is particularly simple, reliable and inexpensive.

According to the invention, a tubular jacket is slidably mounted within the cylinder by means of an actuating device connected to the shaft, the piston being itself slidably mounted in the jacket, and comprises an opening provided in its lateral wall, the jacket being adapted to occupy two positions, either a filling position in which the jacket comes into abutment against the cover and closes the outlet opening for the grounds, in which the opening coincides with the opening of the passage for the grind, and in which the piston passes from its rest position to its packing position, or an ejection position in which the jacket closes the opening for passage of the grind, leaving free the ejection opening for the grounds, and in which after ejection of the grounds, the piston passes from its packing position to its rest position, the different positions being differentiated from each other by a selector of the number of turns of rotation of the rotating shaft.

Thanks to the single and simultaneous control by the shaft of the translatory drive means for the piston and of the device for actuating the jacket, it suffices to impart to the shaft a certain number of turns to obtain automatically all the defined positions of the jacket which comprise a complete cycle for preparation of coffee. This combination body, jacket and piston permits obtaining a compact block easy to make by molding and whose pieces are adapted to be assembled automatically by mass production without the need for adjustment of these various pieces relative to each other.

According to another characteristic of the invention, the piston can moreover occupy an intermediate packing position between the rest position and the packing position in which the piston partially packs the grind above the ejection opening for the grounds, so as to obtain a pressure in the infusion chamber lower than for the normal packing position.

Thus, by adjusting the number of rotative turns of the shaft, the user can selectively produce from the same quantity of coffee, either a coffee of the "espresso" type in which the piston moves directly to the end of its path corresponding to the packing position, so as to increase the pressure in the infusion chamber, or a coffee of the "American" type in which the piston stops before its packing position, in its intermediate position, producing a lower pressure in the infusion chamber, then continues to the packing position permitting then the extraction from the grounds of all the infusion.

The characteristics and advantages of the invention will be further apparent from the description which follows, by way of example, with reference to the accompanying drawing, in which:

DETAILED DESCRIPTION OF THE PREFERRED EMBODIMENT

Figure 1:
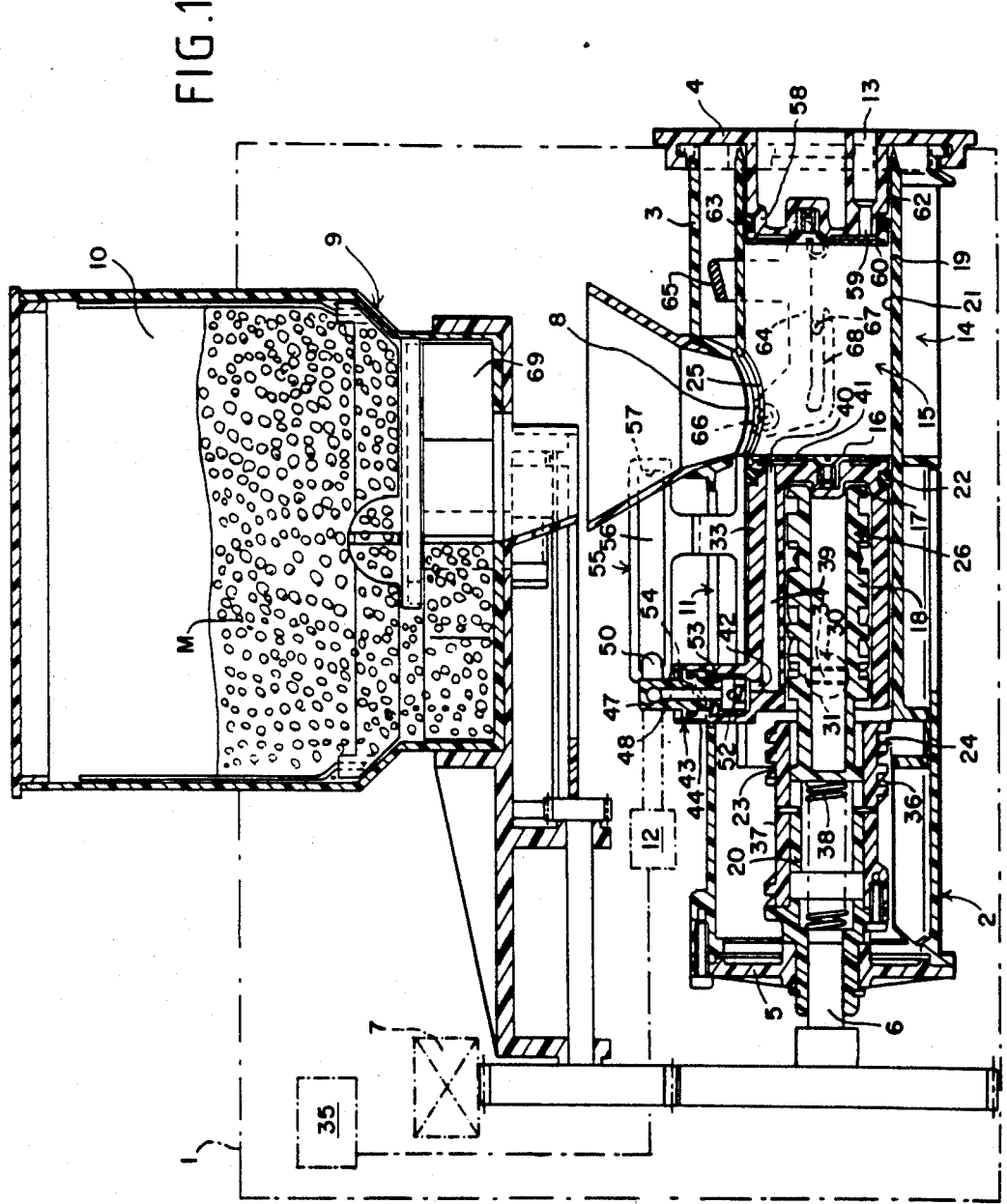
FIG. 1 represents a view in vertical cross section of a coffeemaker according to the invention showing particularly an infusion cylinder comprising a piston in rest position and a jacket in filling position.
Figure 2:
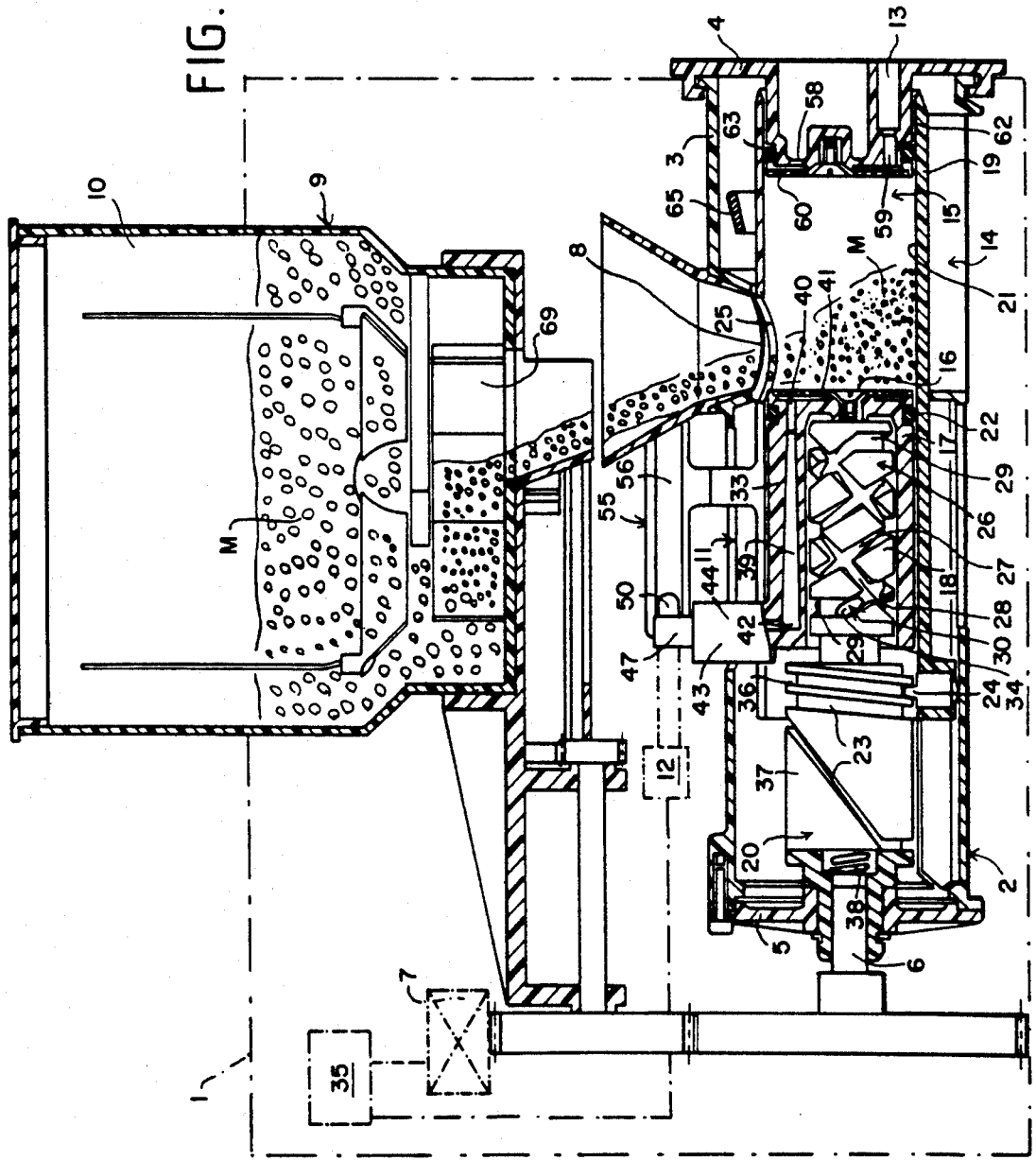
FIG. 2 is a view analogous to that of FIG. 1 in which the translatory drive means of the piston and the actuating device of the jacket are shown in elevation.

The automatic coffeemaker as shown in FIGS. 1 to 5 comprises, in a housing 1 (shown schematically in broken lines in FIGS. 1 and 2), a fixed body 2 which comprises a cylinder 3 closed on the one hand by a cover 4 and on the other hand by a ferrule 5 traversed by a rotatable shaft 6 connected to motorized means 7 (schematically shown in broken lines in FIGS. 1 and 2). Openings are provided in the body 2: an opening 8 for passage of the grind adapted for the introduction of a quantity of ground coffee M by a grinding distributor 9 known per se (shown in FIGS. 1 and 2) associated with a reservoir 10, a liquid feed opening 11 adapted be introduce a quantity of hot water from a water heater 12

(shown schematically in broken line in FIGS. 1 and 2), a passage 13 for evacuation of the infusion, and an opening 14 for ejection of the grounds G. The cylinder 3 is so arranged as to enclose a cylindrical infusion chamber 15 delimited at is ends, on the one hand, by the cover 4 and, on the other hand, by the front face 16 of a piston 17 which is slidably mounted in the cylinder 3 thanks to translatory driving means 18 integral in rotation with said shaft 6.

According to the invention, a tubular jacket 19 is slidably mounted within cylinder 3 by means of an actuating device 20 connected to the shaft 6, the piston 17 being itself slidably mounted in the jacket 19, such that the side wall of the jacket 19 delimits the infusion chamber 15 at its periphery. An annular sealing joint 22 is disposed between the piston 17 and the jacket 19. The actuating device 20 for the jacket 19 comprises a rotating cam 23, constituted by a helicoidal groove in which rides a finger 24 secured to the jacket 19. The jacket 19 comprises an opening 25 provided in its side wall.

As is better seen in FIG. 2, the translatory drive means 18 of the piston comprise a double thread screw 26 mounted rotatably in the body 2 and whose axis is parallel to the direction of movement of the piston 17, said screw 26 comprising at least two helicoidal paths 27, 28, a so-called pressure path 27 and a so-called retraction path 28, which are wound in the opposite direction from each other and are connected by rounded portions 29 at their respective ends so as to constitute together an endless path for a shoe 30 which is movably mounted in the piston 17. The shoe 30 comprises two parts, a cylindrical part 31 mounted rotatably in a corresponding opening 32 (FIGS. 3 and 4) of the side wall 33 of the piston 17 and an oval part 34 with rounded ends adapted to be displaced along one of the paths 27, 28. In the described embodiment, there are chosen preferably four helicoidal paths, namely two pressure paths 27 and two retraction paths 28, and two shoes 30, disposed on opposite sides of the side wall 33 of the piston 17 and each adapted to follow a respective one of the pressure paths 27 or retraction paths 28. The pressure paths 27 and the retraction paths 28 preferably have the same pitch.

The piston 17 can occupy at least two positions, either a rest position (FIG. 1 and 2) in which the piston 17 is retracted from the opening 8 for passage of the grind, permitting flow of said grind M into the chamber 15, or a packing position (FIGS. 4 and 5) in which the opening 8 for passage of the grind being closed, the piston 17 packs the grind M against the cover 4 above the ejection opening 14. Continuous rotation of the screw 26 in the same direction effects displacement of the piston 17 alternately from one position toward the other.

Thus, when the screw 26 turns, each shoe 30 traverses first the corresponding pressure path 27, bringing the piston 17 from its rest position (FIGS. 1 and 2) to its packing position (FIGS. 4 and 5), then turns about a rounded portion 27, pivots in the opening 32 of the side wall 33 of the piston 17, and follows then the corresponding retraction path 28, which effects movement of the piston 17 from its packing position (FIGS. 4 and 5) to its rest position (FIGS. 1 and 2).

The jacket 19 can occupy two positions, either a filling position (FIGS. 1, 2, 3 and 4) in which the jacket 19 comes into abutment against a portion of the cover 4 and closes the opening 14 for ejection of the grounds, wherein the opening 25 coincides with the opening 8 for passage of the grind, and in which the piston 17 passes from its rest position (FIGS. 1 and 2) to its packing position (FIG. 4), or an ejection position (FIG. 5) in which the jacket 19 closes the opening 8 for passage of the grind, leaving free the opening 14 for ejection of the grounds, and in which after ejection of the grounds G, the piston 17 moves from its packing position (FIG. 5) to its rest position. The continuous rotation of the cam 23 in the same direction effects displacement of the jacket 19 alternately from one position toward the other.

The various positions of the jacket and of the piston are defined relative to each other by a selector 35 (schematically shown in broken lines in FIGS. 1 and 2) of the number of rotative turns of the rotatable shaft 6. The selector 35 can be preferably an electronic control device for the motorized means, known per se, comprising a turn counter and controlling incidentally the grind distributor 9 and the water heater 12.

Figure 3:
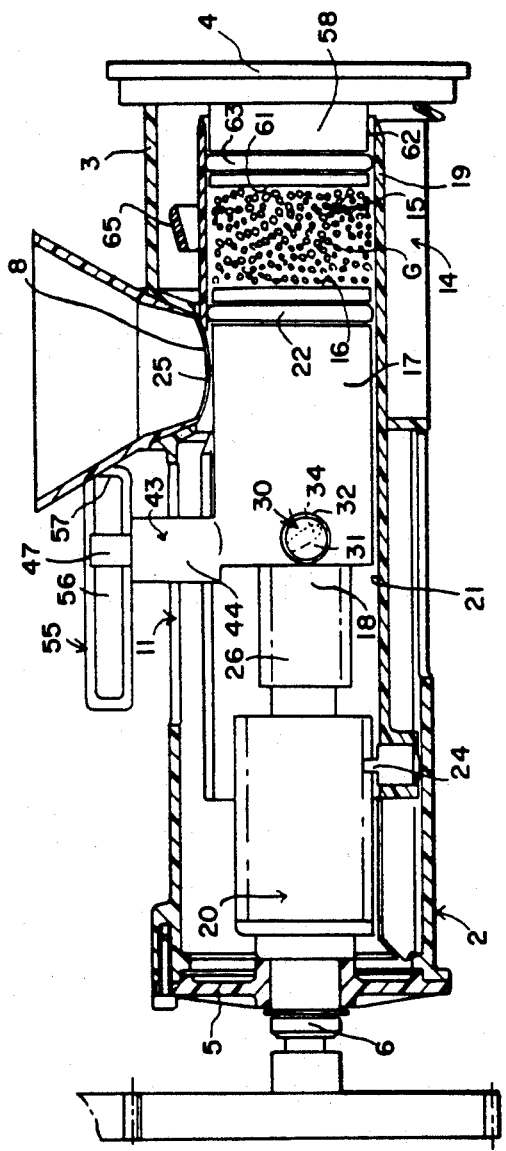
FIG. 3 is a view analogous to that of FIG. 2 in which the piston is shown in elevation, and illustrating the piston in the intermediate packing position and the jacket in its filling position.
Figure 4:
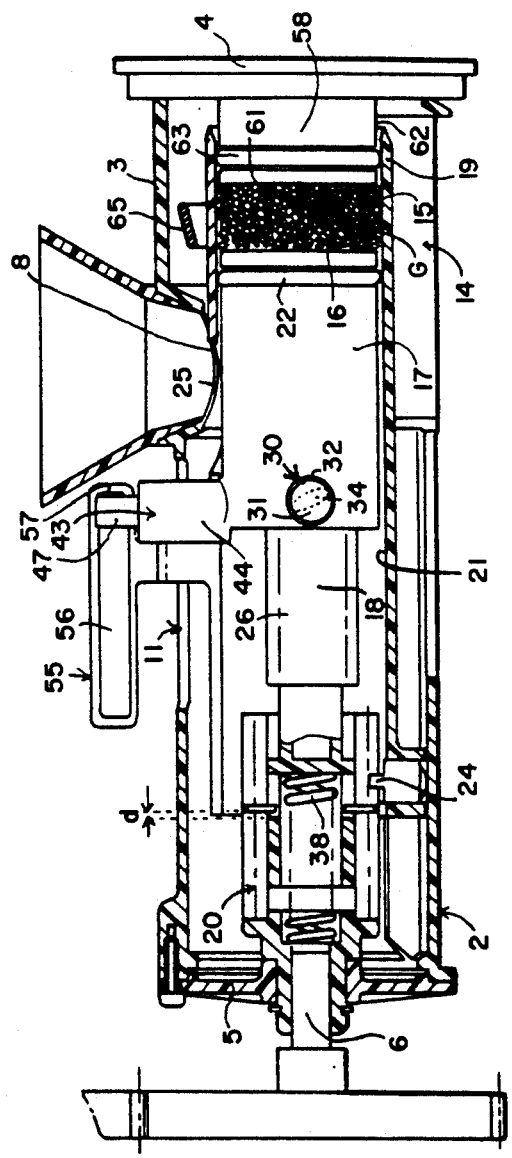
FIG. 4 is a view analogous to FIG. 3 in which the actuating device of the jacket is shown in cross section, and illustrating the position in an ejection position.

As shown in FIG. 3, the piston 17 can moreover occupy a packing position intermediate between the rest position and the packing position in which the piston 17 packs partially the grind M above the opening 14 for ejection of the grounds, so as to obtain a pressure in the infusion chamber 15 lower than for the normal packing pressure.

This position is defined by the selector 35 which stops the rotation of the shaft 6 before the piston 17 is at the end of its path (packing position).

Thus the user can chose to make with the same quantity of grind M either a coffee of the "espresso" type or a coffee of the "American" type.

For an "American" coffee, the selector 35 by means of the shaft 16 brings the piston 17 to its intermediate position, which permits obtaining a lower pressure in the infusion chamber 15, then the piston 17 continues its translation to occupy its packing position, there is then drainage of the cake of grounds G, so as to extract all the aroma from the coffee.

For an "espresso" coffee, the selector 35 causes the piston 17 to advance directly to its packing position, the pressure in the infusion chamber 15 is then raised so as to produce foam on the infusion.

As better shown in FIG. 2, the actuating device 20 for the jacket 19 comprises two parts, namely a part 36 in which the pitch of the groove 23 is small such that the jacket 19 passes slowly from its ejection position toward its filling position, and another portion 37 in which the pitch of the groove 23 is large so that the jacket 17 passes rapidly from its ejection position to its filling position.

As is better seen in FIGS. 1 to 4, the actuating device 20 for the jacket 19 and the translatory drive means 18 of the piston 17 are constituted by two distinct members, fixed in rotation with each other by means of a resilient member 38, preferably of the Boudin spring type, interposed between the shaft 6 and the translatory drive mans 18 of the piston 17, so as to permit in the packing position a very slight displacement d of the piston 17 toward its rest position when the volume of grind M is too great in the infusion chamber 15.

In the case of introduction of a volume of grind M greater than the normal volume, the spring 38 permits a slight recoil d of the screw 26 and of the piston 17 and therefore the volume of the infusion chamber 15 slightly increases. Thus the spring 38 compensates the difference of volume.

Moreover, the spring 38 permits after infusion a slight drainage of the grounds G by causing the piston 17 to advance slightly, and thus compensates the difference of volume existing between the grind M and the grounds G.

Figure 5:
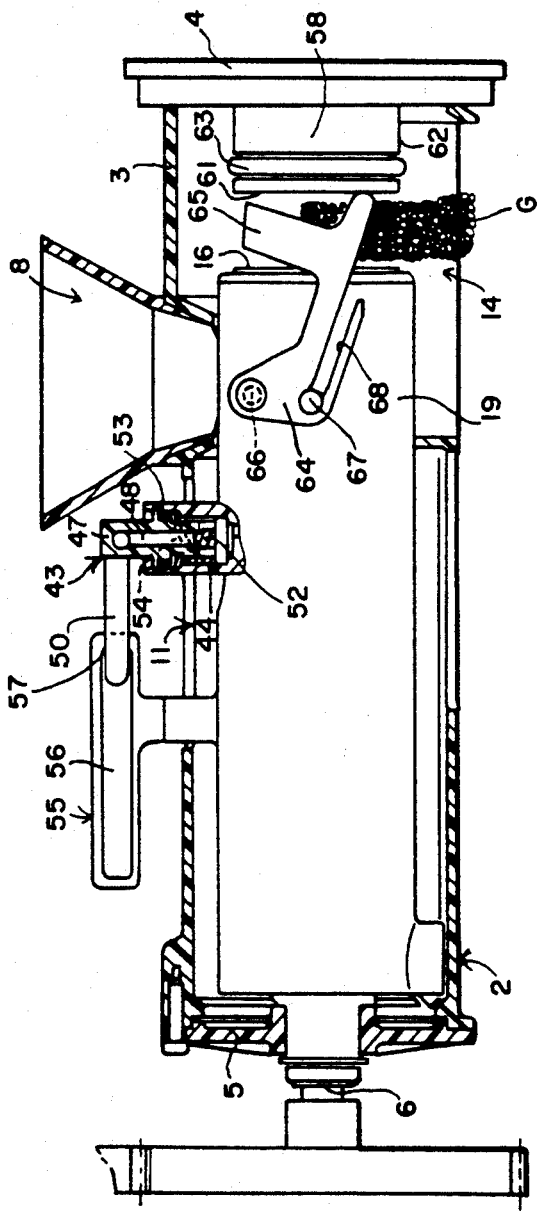
FIG. 5 is a view analogous to FIG. 2 in which the jacket is shown in elevation, and illustrates, when the jacket is in ejection position and the piston in packing position, the means for expulsion of the grounds.
Figure 6:
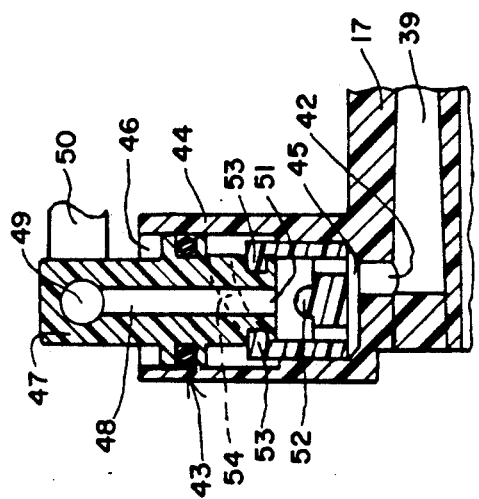
FIG. 6 is a cross sectional view of the closure in its open condition.

As shown in FIGS. 1 and 5 and in particular in FIG. 6, the piston 17 comprises a longitudinal liquid feed channel 39 whose outlet 40 opens on the front face 16 of piston 17 and is provided with a filter 41, and whose inlet 42 is connected to the water heater 12. The inlet 42 comprises a safety closure 43, whose condition depends on the relative position of piston 17 relative to the jacket 19 so as to occupy either "closed" condition in which it closes the inlet 42 (FIG. 5) when the jacket occupies its ejection position and the piston 17 its packing position, or an "open" condition in which it frees said inlet 42 (FIGS. 1 and 6) when the jacket 19 occupies its filling position and the piston 17 its rest position.

The closure 43 is carried by the piston 17 and comprises a tubular box 44 passing through the side wall 21 of the jacket 19 and whose bottom 45 contains the inlet 42 of the channel 39 and whose other end 46 is closed by a plug 47. The plug 47 has a central conduit 48 whose inlet 49 is connected to the end of a water inlet tube 50 and whose outlet 51 is located facing a pin valve 52 that is movable in translation. The pin valve 52 has for this purpose at least one prong 53 which is in gripping relation with a helicoidal ramp 54 provided on the plug 47. Said tube 50 is connected by its other end to a control member 55 which is fixed for rotation with a side wall 21 of the jacket 19 such that the rotation of plug 47 will be effected by displacement of the jacket 19 relative to the piston 17.

The rotation control member 55 is constituted by an extension of the side wall of the jacket 19 and which comprises a hole 56 elongated in the direction of translation of the jacket 19 and of a length substantially equivalent to the path of piston 17. The water inlet tube 50 passes with a certain play through the elongated hole 56. When the jacket 19 occupies its filling position and the piston its rest position (FIG. 1), the water inlet tube 50 is substantially perpendicular to the elongated hole 56, and the pin valve 52 is retracted from the outlet 51 of conduit 48. When the piston 17 passes to its packing position (FIG. 4) which corresponds to a travel of about 40 millimeters, the closure 43 follows the movement but as the tube 50 remains perpendicular to the hole 56, it comes into abutment against the edge 57 of the elongated hole 56. When the jacket 19 passes to its ejection position (FIG. 5), which corresponds to a supplemental path of movement of about 40 millimeters, the tube 50 being in abutment against the edge 57, causes the plug 47 to turn by about 45°. The prong 53 of the pin valve 52 rises in the groove 54 of plug 47 which effects the translation of the pin valve 52 toward the outlet 51 of the conduit 48, which it closes.

As is seen more particularly in FIG. 1, the cover 4 is mounted removably on the cylinder 3 and has a central cylindrical boss 58 of a diameter slightly less than that of the jacket 19, boss 58 comprising a passage 13 for evacuation of the infusion whose mouth 59 is provided with a filter 60 carried by the front surface 61 of boss 58, and which comprises on its side surface 62 an annular sealing joint 63 so as to render the infusion chamber 15 sealed between the jacket 19 and the cover 4 when the jacket 19 occupies its filling position.

This removability permits the user to properly clean the infusion chamber 15 and the filters 60 and 41.

As is seen in FIGS. 1 and 5, the expulsion means 64 are associated with the jacket 19 and comprise a wiper 65 mounted pivotally about a fixed transverse axle 66 which is integral with body 2 thanks to means 67, 68 which mutually cooperate with the jacket. The cooperating means are constituted by at least one lug 67, but preferably two lugs mounted on jacket 19 symmetrically relative to each other and adapted each to ride in a corresponding guide 68 of the wiper 65.

The wiper 65 can occupy two positions, namely an inactive position (FIG. 1) to which it is brought when the jacket 19 occupies its filling position and in which it is held away from the infusion chamber 15, and an active position (FIG. 5) to which it is brought when the jacket 19 occupies its ejection position (FIG. 2) and in which it pushes against and sweeps out the grinds G with a movement transverse to the jacket so as to make them pass through the opening 14 for ejection of the grounds.

The jacket 19, the piston 17, the cover 4, the screw 26 and the cam 23 are preferably of plastic, which has the advantage and being mass producible at low cost.

According to the invention, the operation of the coffeemaker proceeds according to the following infusion cycle:

In an initial stage (FIG. 1), the jacket 19 occupies its filling position and the piston 17 its rest position. The closure 43 is in its "open" condition. The expulsion means 64 occupy their inactive position. There is shown, above the opening 8 for passage of the grind, the grind distributor 9 which comprises, for example, a paddle 69 which is connected to motor means 7.

In a filling stage (FIG. 2), the grind distributor 9 dumps a quantity of grind M through the opening 8 for passage of the grind and the opening 25 of the jacket 19, into the infusion chamber 15.

In an intermediate packing stage (FIG. 3), the shaft 6 drives in rotation the screw 26 of the piston 17, which moves toward the intermediate packing position. The infusion chamber 15 is then sealed by the joints 22 and 63 located, on the one hand between the piston 17 and the jacket 19 and, on the other hand, between the boss 58 of cover 4 and the jacket 19. In the case in which the user desires "American" style coffee, the hot water from the water heater 12 controlled by the selector 35 is introduced into the infusion chamber 15 through the feed channel 69 of the piston 17.

In a packing stage (FIG. 4), the shaft 6 continues to drive in rotation the screw 26 of piston 17 which moves toward its packing position.

There will thus be noted two cases:

In the case in which the user wishes "American" style coffee, the grounds G are expressed by the piston so as to extract all the infusion present in the grounds G after the infusion which is produced by intermediate packing.

In the case in which the user desires "espresso" coffee, the grind M is packed and then hot water from the water heater 12 is injected through the feed channel 39 of the piston 17. After infusion, the grind M is slightly expressed by means of spring 38.

In the two cases, the infusion is evacuated through the infusion evacuation passage 13.

Simultaneously, the shaft 6 drives in rotation the actuating device 20 of the jacket 19, which, thanks to the small pitch of the first portion 36 of the device 20, moves very slowly toward its filling position.

In an ejection stage (FIG. 5), thanks to the larger pitch of the second portion 37 of the actuating device 20 of the jacket 19, the jacket moves rapidly toward its filling position.

When moving, the jacket causes the water inlet tube 15 and the lug 47 to pivot, which brings the closure 43 to active position, thus the hot water or the steam can neither leave through the liquid feed channel 39 nor rise through the infusion chamber 15 toward the water heater 12 even though the infusion chamber 15 is no longer sealed.

Simultaneously, the jacket 19 drives the expulsion means 64 to their active position, the pivoting blade 65 bearing on the cake of grounds G so as to eject it through the grounds ejection opening 14.

In a stage of return to the initial stage, the shaft 6 continues to drive in rotation the screw 26 of the piston 17, which returns toward its rest position. Simultaneously, the shaft 6 continues to drive in rotation the actuating device 20 of the jacket 19, causing the jacket to return to its filling position.

What is claimed is:

1. Automatic coffeemaking machine comprising, in a housing (1), a fixed body (2) which comprises a cylinder (3) closed on one side by a cover (4) and on an opposite side by a ferrule (5) traversed by a rotatable shaft (6) connected to motorized means (7), and in which are provided openings, an opening (8) for passage of grind being adapted for the introduction of a quantity of ground coffee (M), an opening (11) for feeding liquid being adapted to introduce a quantity of hot water from a water heater (12), a passage (13) for evacuation of infusion, and an opening (14) for ejection of grounds, said cylinder (3) being adapted to close a cylindrical infusion chamber (15) and comprising a piston (17) having a front face (16) and being slidably mounted in the cylinder (3) by translatory drive means (18) fixed in rotation with said shaft (6), said piston being adapted to occupy at least two positions comprising either a rest position in which the piston (17) is retracted from the opening (8) of the grind passage, permitting the flow of said grind (M) into the chamber (15), or a packing position in which the opening (8) for passage of the grind is closed, the piston (17) packing the grind (M) above the ejection opening (14) against the cover (4), and a tubular jacket (19) which is slidably mounted within the cylinder (3) by means of an actuating device (20) connected to the shaft (6), the piston (17) being itself mounted slidably in the jacket (19), and which comprises a filling opening (25) provided in a lateral wall of said jacket (19), said jacket (19) being adapted to occupy two positions comprising either a filling position in which the jacket (19) comes into abutment against the cover (4) and closes the opening (14) for ejection of grounds, causing the filling opening (25) and the opening (8) for passage of the grind to coincide, and in which the piston (17) passes from said rest position to said packing position, or an ejection position in which the jacket (19) closes the opening (8) for passage of the grind, leaving open the opening (14) for ejection of the grounds, and in which after ejection of the grounds, the piston (17) passes from said packing position to said rest position, said positions being differentiated from each other by a selector (35) of the number of revolutions of the rotatable shaft (6), wherein the translatory drive means (18) of the piston comprises a double thread screw (26) mounted rotatably in the body (2) and whose axis is parallel to the direction of movement of the piston (17), said screw (26) comprising at least two helicoidal paths (27, 28) comprising a pressure path (27) and a retraction path (28), said paths being wound in opposite directions from each other and interconnected by a rounded portion (29) at their respective ends so as to constitute together an endless path for a shoe (30) which is movably mounted in the piston (17), such that the continuous rotation of the screw (20) in the same direction effects a displacement of the piston (17) alternatively from one position to the other and wherein the actuating device (20) of the jacket (19) comprises a revolving cam (23) constituted by a helicoidal groove in which is disposed a finger (24) integral with the jacket (19) such that continuous rotation of the cam (23) in the same direction produces displacement of the jacket (19) alternately from one position to the other.

2. Coffeemaking machine according to claim 1, wherein the piston (17) also occupies an intermediate packing position between said rest position and said packing position in which intermediate position the piston (17) partially packs the grind (M) above the opening (14) for ejection of the grounds, so as to obtain a lower pressure in the infusion chamber (15) than in the first-mentioned packing position.

3. Coffeemaking machine according to claim 1, wherein said actuating device (20) of the jacket (19) is in two portions (36-37) comprising a portion (36) in which the pitch of the groove (23) is small such that the jacket (19) passes slowly from its ejection position to its filling position, and another portion (37) in which the pitch of the groove is large such that the jacket (19) passes rapidly from its ejection position to its filling position.

4. Coffeemaking machine according to claim 1, wherein the piston (19) comprises a channel (39) for feeding liquid, said channel having an outlet (30) which opens on said front face (16) of the piston and is provided with a filter (41), said channel having an inlet (42) which is connected to said water heater (12) and comprises a safety closure (43) whose condition depends on the position of the piston (17) relative to the jacket (19) so as to occupy, either a closed position in which said closure (43) closes said inlet (42) when the jacket (19) occupies said ejection position and the piston (17) said packing position, or an open position in which said closure (43) frees said inlet (42) when the jacket (19) occupies said filling position and the piston (17) said rest position.

5. Coffeemaking machine according to claim 4, wherein the closure (43) is carried by the piston (17) and comprises a tubular box (44) passing through said lateral wall of the jacket (19) and whose bottom (45) has said inlet (42) of the channel (39) and whose other end is closed by a plug (47) having a central conduit (48) whose inlet (49) is connected to the end of a supply tube for water (50) and of which the outlet (51) is located facing a pin valve (52) movable in translation and having for this purpose a prong (53) which is in gripping relation with a helicoidal ramp (54) provided on the plug (47), said tube (50) being connected by its other end to a rotation control member (55) integral with said lateral wall of the jacket (19) such that the rotation of the plug (47) will be effected by the relative displacement of the jacket (19) relative to the piston (17).

6. Coffeemaking machine according to claim 1, wherein the cover (4) is removably mounted on the cylinder (3) and has a cylindrical central boss (58) of a diameter slightly less than that of the jacket (19), the boss (58) comprising said passage (13) for evacuation of infusion, said passage (13) having a mouth (59) provided with a filter (60) carried by a front face (61) of the boss (58), said boss (58) having on a side surface (62) a sealing joint (63) so as to render the infusion chamber (15) sealed between the jacket (19) and the cover (4) when the jacket (19) occupies said filling position.

7. Coffeemaking machine according to claim 1, wherein the actuating device (20) of the jacket (19) and the translatory drive means (18) of the piston (17) are constituted by two distinct members, rotatably interconnected with each other by means of a resilient member (38) interposed between the shaft (6) and the translatory drive means (18) of the piston (17), so as to permit in said packing position a slight displacement (d) of the piston (17) toward said rest position when the volume of grind (M) is too great in the infusion chamber (15).

8. Coffeemaking machine according to claim 1, wherein said jacket has expulsion means (64) comprising a wiper (65) pivotally mounted about a fixed axle (66) transverse to the body (2), so as to occupy two positions comprising either an inactive position to which said wiper is brought when the jacket (19) occupies said filling position and in which said wiper is held away from the infusion chamber (15), or an active position to which said wiper is brought when the jacket (19) occupies said ejection position and in which said wiper bears against and discharges the grounds (G) with a movement transverse to the jacket (19) so as to cause the grounds to pass through said grounds ejection opening (14).

* * * * *